United States Patent
Lei et al.

(10) Patent No.: US 8,266,137 B2
(45) Date of Patent: Sep. 11, 2012

(54) METHOD AND APPARATUS FOR GENERATING INDEX AS WELL AS SEARCH METHOD AND SEARCH APPARATUS

(75) Inventors: Hao Lei, Beijing (CN); Ye Tian, Beijing (CN); Ke Zeng, Beijing (CN); Liming Wang, Beijing (CN); Toshikazu Fukushima, Beijing (CN)

(73) Assignee: NEC (China) Co., Ltd., Beijing (CN)

( * ) Notice: Subject to any disclaimer, the term of this patent is extended or adjusted under 35 U.S.C. 154(b) by 284 days.

(21) Appl. No.: 12/616,551

(22) Filed: Nov. 11, 2009

(65) Prior Publication Data
US 2010/0121856 A1      May 13, 2010

(30) Foreign Application Priority Data
Nov. 11, 2008   (CN) .......................... 2008 1 0172722

(51) Int. Cl.
    *G06F 17/30* (2006.01)
(52) U.S. Cl. ........................................ 707/713; 707/715
(58) Field of Classification Search .................. 707/713, 707/715; 713/168
    See application file for complete search history.

(56) References Cited

U.S. PATENT DOCUMENTS

| | | | |
|---|---|---|---|
| 5,778,374 A * | 7/1998 | Dang et al. ............................. | 1/1 |
| 6,769,062 B1 * | 7/2004 | Smeets et al. .................. | 713/189 |
| 7,724,906 B2 * | 5/2010 | Matsushita .................... | 380/277 |
| 7,801,885 B1 * | 9/2010 | Verma ........................... | 707/713 |
| 7,874,013 B2 * | 1/2011 | Kaminaga et al. .............. | 726/28 |
| 7,890,493 B2 * | 2/2011 | Chen .............................. | 707/713 |
| 2001/0014936 A1 * | 8/2001 | Jinzaki .......................... | 711/221 |
| 2004/0230461 A1 * | 11/2004 | Talib et al. ...................... | 705/7 |
| 2006/0080332 A1 * | 4/2006 | Hall ............................... | 707/100 |
| 2006/0101285 A1 * | 5/2006 | Chen et al. ..................... | 713/193 |
| 2006/0285596 A1 * | 12/2006 | Kondo et al. ............. | 375/240.16 |
| 2007/0078848 A1 * | 4/2007 | Sareen et al. ..................... | 707/5 |
| 2007/0255771 A1 * | 11/2007 | Inoue et al. .................... | 707/205 |
| 2007/0282749 A1 * | 12/2007 | Nonaka et al. .................. | 705/51 |

(Continued)

FOREIGN PATENT DOCUMENTS

JP       2006236161 A       9/2006

(Continued)

OTHER PUBLICATIONS

Japanese Office Action issued in corresponding Japanese Application No. 2009-257645 on Nov. 1, 2011.

*Primary Examiner* — Hanh Thai
(74) *Attorney, Agent, or Firm* — Sughrue Mion, PLLC (57) ABSTRACT

The present invention provides a method and apparatus for generating index as well as a search method and a search apparatus. Index entry comprises at least a search item identifier corresponding to a search item, one or a plurality of index items generated from one or plural pieces of search information, and an accumulator for the search information. The accumulator is generated by accumulating the search information, or accumulating ciphertext of information containing the search information, or accumulating data mapped from information containing the search information. At the time of searching, the index items and the accumulator are provided to a searcher. The searcher extracts search information from the index items and checks whether the extracted search information is complete by using the accumulator. In one embodiment, the accumulator is incorporated in an encrypted inverted index.

26 Claims, 3 Drawing Sheets

U.S. PATENT DOCUMENTS

| | | | |
|---|---|---|---|
| 2007/0282836 A1* | 12/2007 | Son | 707/6 |
| 2008/0005100 A1* | 1/2008 | Hsu | 707/5 |
| 2008/0065682 A1* | 3/2008 | Karasudani et al. | 707/102 |
| 2008/0133935 A1* | 6/2008 | Elovici et al. | 713/193 |
| 2008/0222117 A1* | 9/2008 | Broder et al. | 707/3 |
| 2008/0243907 A1* | 10/2008 | Stergiou et al. | 707/102 |
| 2008/0306908 A1* | 12/2008 | Agrawal et al. | 707/3 |
| 2009/0055361 A1* | 2/2009 | Birdwell et al. | 707/3 |
| 2009/0076927 A1* | 3/2009 | Sridhar et al. | 705/26 |
| 2009/0083257 A1* | 3/2009 | Bargeron et al. | 707/5 |
| 2009/0083293 A1* | 3/2009 | Albrecht et al. | 707/100 |
| 2009/0148047 A1* | 6/2009 | Nakajima | 382/190 |
| 2009/0313238 A1* | 12/2009 | Merrigan et al. | 707/5 |
| 2010/0057690 A1* | 3/2010 | Chu et al. | 707/3 |
| 2011/0066607 A1* | 3/2011 | Wong | 707/706 |
| 2011/0270865 A1* | 11/2011 | Ookuma | 707/769 |

FOREIGN PATENT DOCUMENTS

| | | |
|---|---|---|
| JP | 200752698 A | 3/2007 |

* cited by examiner

METHOD AND APPARATUS FOR GENERATING INDEX AS WELL AS SEARCH METHOD AND SEARCH APPARATUS

FIELD OF THE INVENTION

The invention relates generally to information processing techniques, and more particularly to a method and an apparatus for generating an index as well as a search method and a search apparatus, which enable completeness verification on search result.

BACKGROUND

In various applications, search on large amount of information is needed to acquire information meeting special conditions. Generally, an index is built in advance for original information. After that, search is performed in the index to find out a matching item in response to a search request, and thereby related information is retrieved. Due to various reasons, a searcher always wish to get a complete set of resulted information of search, that is, all information satisfying the search condition. However, the existing techniques for indexing and searching do not guarantee completeness of search.

With wide use of computer network and communication technique, data owner often stores data files on a server(s) maintained by a third party. In such application, the service of searching on data files stored on a server is also provided by a third party. That is to say, the third party who provided the search service looks up data files stored on the server by using the index in response to a request from a searcher, and provides the search result to the searcher. Since the substantive work in searching is performed by the third party, it is even more desired in such situation that the correctness and completeness of search can be verified and ensured.

In addition, with the concern of privacy and safety, data files are often stored after being encrypted. Especially in the above case of storage service, files are often stored in a ciphertext form on the server to prevent the contents of the files from revealing to unauthorized users (in some case, also including the third party who provides the storage and search services). However, the encrypted storage of the files makes it difficult to search on files, and especially makes it hard to verify correctness and completeness of the search result.

SUMMARY OF THE INVENTION

The present invention provides a method and an apparatus for generating index as well as a search method and a search apparatus.

According to one aspect of the invention, a method for generating an index is provided, comprising: generating a search item identifier corresponding to a search item; generating one or more index items according to one or more pieces of search information associated with the search item; generating an accumulator for the one or more pieces of search information; and generating an index entry with at least the search item identifier, the one or more index items and the accumulator so as to form an index.

According to one aspect of the invention, an apparatus for generating an index is provided, comprising a search item identifier generating unit adapted to generate a search item identifier corresponding to a search item; an index item generating unit adapted to generate one or more index items according to one or more pieces of search information associated with the search item; an accumulator generating unit adapted to generate an accumulator for the one or more pieces of search information; and an index forming unit adapted to generate an index entry with at least the search item identifier, the one or more index items and the accumulator so as to form an index.

According to one aspect of the invention, a search method is provided, comprising: generating a search request; receiving one or more index items and an accumulator; extracting one or more pieces of search information from the received one or more index items; and verifying the extracted search information by the received accumulator.

According to one aspect of the invention, a search apparatus, comprising: a search requesting unit adapted to generate a search request; a search information extracting unit adapted to extract one or more pieces of search information from one or more index items received; and a verifying unit adapted to verify the extracted search information by a received accumulator.

With the method of the invention, completeness and correctness of the search result may be verified by using an accumulator. The invention may be applied to an inverted index, especially an encrypted inverted index. With an encrypted inverted index having set therein privacy levels, favorable privacy control and confidentiality are provided based on verification of search result.

BRIEF DESCRIPTIONS OF THE DRAWINGS

The present invention will be better understood from the following detailed description of the preferred embodiments of the invention, taken in conjunction with the accompanying drawings in which like reference numerals refer to like parts and in which.

DESCRIPTION OF THE PREFERRED EMBODIMENTS

The features of various aspects of the invention and the exemplary embodiments will be described in detail below with reference to the drawings. In the following detailed description, numerous specific details are set forth to provide a full understanding of the present invention. It will be obvious, however, to one of ordinary skill in the art that the present invention may be put into practice without some of these specific details. The detailed description of the embodiments below is only for the purpose of better understanding of the invention by illustrating examples of the invention. The invention is never limited to any specific configuration and algorithm set forth below, but covers any modifications, alternatives and improvements of the elements, components and algorithms, as long as not departing from the spirit of the invention. In the drawings and the following description, well-known structures and techniques are not shown so as to avoid unnecessarily obscuring the present invention.

Figure 1:
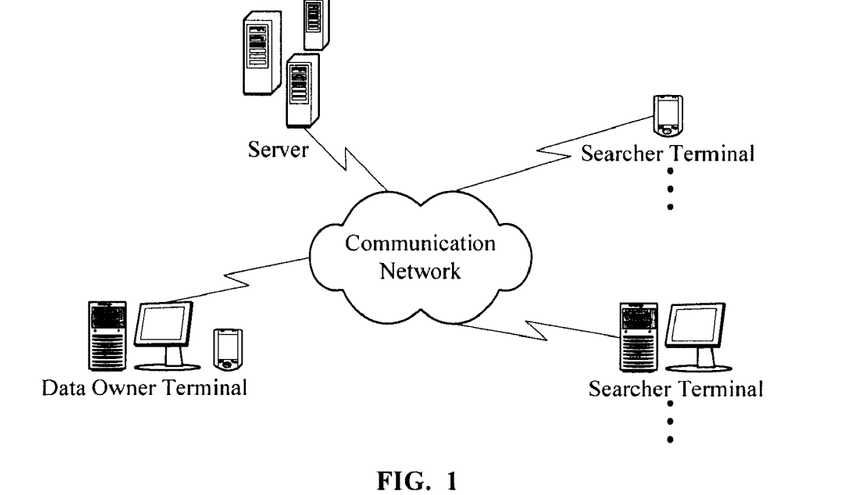
FIG. 1 is a block diagram illustrating an exemplary search system.

FIG. 1 schematically illustrates an exemplary search system in which the invention may be applied. As shown in FIG. 1, a data owner's apparatus or terminal, a server managed by a service provider and one or more searchers' apparatus or terminals are connected and communicable with each other via a communication network. The data owner stores files and an index of these files to the server. The server performs search on files by using the index in response to a search request from a searcher terminal, and provides the search result to the searcher.

It should be noted that the term "server" as used throughout the description may be a single apparatus providing both storage and search services, or a set of multiple apparatus adjacent or remote to each other, each responsible for different services such as storage, data search, user management and the like, or sharing the burden of a service. For example, the data owner may store the file on a storage server, and store the index on a search server which is communicable with the storage server. To simplify the description, all such apparatus are generally referred to as "server" in the description and drawings. The data owner terminal and the server are shown as separate apparatus in the figure. However, it would be appreciate that the functionalities of both the data owner terminal and the server in the invention as described below may be implemented by a single apparatus.

Each of the apparatus or terminal of the data owner and searchers may be implemented as a device capable of processing and communicating information, for example, a personal computer (PC), a personal digital assistant (PDA), a smart mobile phone, or other data processing device. The server is generally implemented as a device or a set of devices capable of storing and maintaining a large amount of data and enabling conditional access by the terminals to data, and managed by a service provider.

In the system as shown, the data owner indexes his/her files and stores the files and the index on the server. At the time of searching, the searcher sends a request including information of a search item (e.g. a search item identifier). The server looks up the index for a matching index entry according to the information of the search item, provides index items in the index entry, which are related to the search item, to the searcher for retrieval of related information. Specially, in the solution according to the invention, an accumulator is also included in the index entry for verification of completeness of the search result. The server also provides the accumulator in the index entry to the searcher. The searcher checks whether the search result is complete and correct with the use of the accumulator.

In a common application, an inverted index is often used where files containing a keyword are searched out based on that keyword. In the following description, the application of an inverted index is taken as an example. However, it should be noted that the invention is also applicable to a non-inverted index in a similar way.

Figure 2:
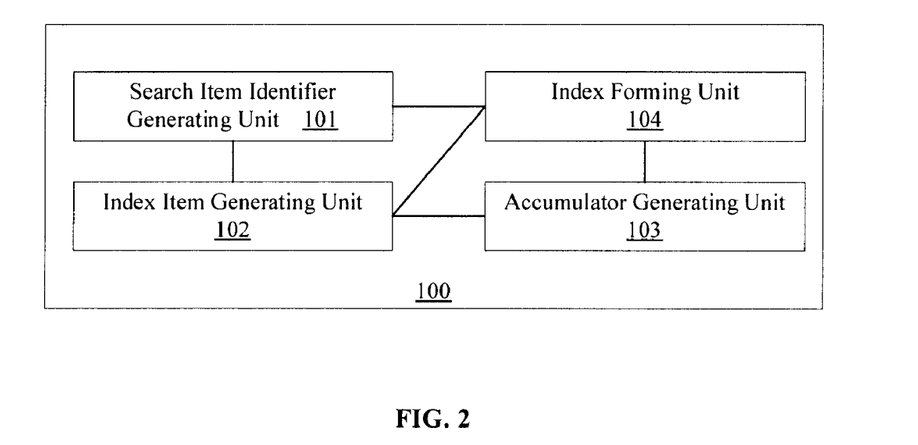
FIG. 2 is a block diagram schematically illustrating an exemplary configuration of a data owner terminal according an embodiment of the invention.

FIG. 2 schematically illustrates an exemplary configuration of the data owner terminal 100 according an embodiment of the invention. As shown in FIG. 2, the data owner terminal 100 mainly comprises a search item identifier generating unit 101, an index item generating unit 102, an accumulator generating unit 103 and an index forming unit 104.

Figure 3:
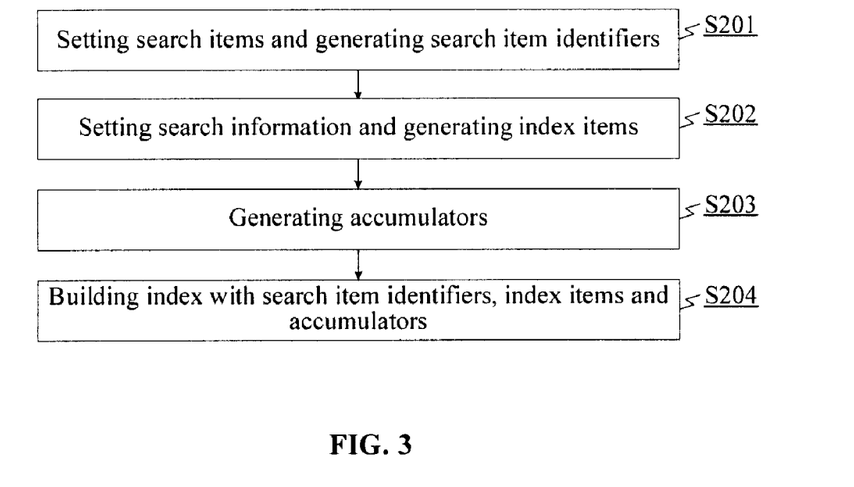
FIG. 3 is a flow chart schematically illustrating the processes of generating an index according to an embodiment of the invention.

FIG. 3 schematically illustrates processes for generating an index by the data owner terminal 100 according to this embodiment.

First, at step S201, search items with respect to the files of the data owner are set, and the search item identifier generating unit 101 generates respective search item identifiers according to the search items. In the application of the inverted index, the search item is a keyword. For example, the data owner terminal extracts keywords in each file and takes them as the search items; or the data owner sets the search items manually by inputs to the terminal. Supposing that keywords, which are different from each other, are set as search items, for a search item (keyword) KW, the search item identifier generating unit 101 generates a corresponding unique identifier KL of the search item.

The search item identifier KL may be for example the search item KW per se, or data that is mapped to the search item KW. In the application of encrypted index, the search item identifier KL may be the ciphertext of KW, or data containing information of KW. For example, KL may be computed as follow:

$$KL = \text{Hash}(MEK\|KW) \quad \text{(Equation 1)}$$

where Hash( ) denotes a Hash function, MEK is a specific parameter (e.g., a master key of the data owner) and "∥" denotes a combination of strings or numerals in a preset order. Alternatively, KL=E(EKey, KW) where EKey is a specific key, E(EKey, KW) represents encryption of KW with EKey.

At step S202, search information related to each search item is set and the index item generating unit 102 generates index item corresponding to each piece of search information. Each search item corresponds to one or plural pieces of information. The search information may be any information supplying search result matching that search item. For example, in an inverted index, for a search item (keyword) KW, a file name or file location of each file containing the keyword KW (or any other information related to such files) is set as a piece of search information related to this search item. For example, for a search item KW, file names of n files containing the keyword KW are set as n pieces of search information $I_1$, $I_2$, $I_n$ related to the search item KW.

It shall be noted that in the application of encrypted storage, the data owner may store ciphertext rather than plaintext of the files on the server. In such case, the above-mentioned file name may be a ciphertext file name of the encrypted file.

For each piece of search information, the index item generating unit 102 generates an index item which contains that search information or from which that search information may be derived. For a piece of search information $I_j$ (j=1, 2, . . . n), the index item generating unit 102 generates an index item $FL_j$. The index item $FL_j$ is for example the search information $I_j$ per se, or any value from which the search information $I_j$ may be obtained through certain conversion. In one of applications of encrypted index, the index item $FL_j$ may be a ciphertext data containing information $I_j$. For example, the index item $FL_j$ may be calculated as follow:

$$FL_j = E(EKey, I_j\|Key) \quad \text{(Equation 2)}$$

where EKey is a specific key, Key is a specific parameter (e.g., a key used by the data owner in encrypting the file) and E(EKey, $I_j$∥Key) represents encryption of the combination of $I_j$ and Key with EKey.

Then at step S203, the accumulator generating unit 103 generates accumulators, each accumulating all pieces of search information related to a search item, for verification of completeness of the search result. The accumulators may be generated by various methods as long as a searcher terminal can check whether the search result containing each search information is complete or not. The computing of the accumulators is described below by taking examples of exclusive OR (XOR) operation, modular operation and accumulation signature. One skilled in the art may appreciate that other algorithms may be employed to generate the accumulators.

EXAMPLE 1

XOR Operation

For all pieces of search information $I_1, I_2, \ldots I_n$ related to the search item KW, the accumulator generating unit 103 generate a completeness accumulator IC with XOR operations as follow:

$$IC = I_1 \oplus I_2 \oplus \ldots \oplus I_n \quad \text{(Equation 3)}$$

where $\oplus$ denotes XOR operation.

The Equation 3 may be calculated by iterative operations as follow:
set IC=0
for j=1 to n $$IC = IC_m \oplus I_j$$

next j

EXAMPLE 2

Modular (Mod) Operation

With modular operations, the accumulator generating unit 103 may generate the completeness accumulator IC as follow:

$$IC = \prod_{j=1}^{n} I_j \bmod p \quad \text{(Equation 4)}$$

or $$IC = \sum_{j=1}^{n} I_j \bmod p \quad \text{(Equation 5)}$$

where p is a big prime number.

The Equation 4 may be calculated by iterative operations as follow:
set IC=1
for j=1 to n $$IC = (IC * I_j) \bmod p$$

next j

The Equation 5 may be calculated by iterative operations as follow:
set IC=0
for j=1 to n $$IC = (IC + I_j) \bmod p$$

next j

EXAMPLE 3

Accumulation Signature

It is assumed that the following security parameters are set in advance: a big prime number p; two groups $G_1$ and $G_2$ of the same order p; $g_1$ and $g_2$, which are the generators of $G_1$ and $G_2$, respectively; $Z_p^*$, which is a collection of all positive integers less than and coprime to p; and a bilinear mapping e defined as $G_1 \times G_2 \rightarrow G_T$; which has the following characteristics:

(1) bilinearity: there is a relation $e(g_1^a, g_2^b) = e(g_1, g_2)^{ab}$ for every $g_1$ and $g_2$ and every a and b belonging to $Z_p^*$; and (2) nondegeneracy: $g_1 = O$ if $e(g_1, g_2) = 1$ and there is a $g_2$ belonging to $G_2$, and, a hash function which maps $\{0,1\}^*$ to $G_1$ is set, a random number K is selected from $Z_p^*$, and a secret key sk is set, wherein $g_2$ and the random number K are published to the searchers, or otherwise $g_2^K$ is published to the searchers.

Then, the accumulator generating unit 103 may generate the accumulator IC as follow:

$$IC = \prod_{j=1}^{n} H(I_j)^{1/(sk+K)} \bmod p \quad \text{(Equation 6)}$$

The Equation 6 may be calculated by iterative operations as follow:
set IC=1
for j=1 to n $$IC = (IC * H(I_j)^{1/(sk+K)}) \bmod p$$

next j

After the accumulators are generated, the index forming unit 104 generates, for each search item, an index entry. Each index entry includes at least the search item identifier of that search item, all index items related to that search item, and the accumulator obtained by accumulating all search information related to that search item. Then, the index forming unit 104 forms an index comprising each index entry. It should be noted that the random number K may be selected differently for accumulation of different set of index items to generate respective accumulators.

Thus, an index containing accumulators is generated at the data owner terminal 100. After that, the data owner terminal may store the files and the generated index to the server for future use.

The use of the accumulator is described below with reference to FIGS. 4 and 5.

Figure 4:
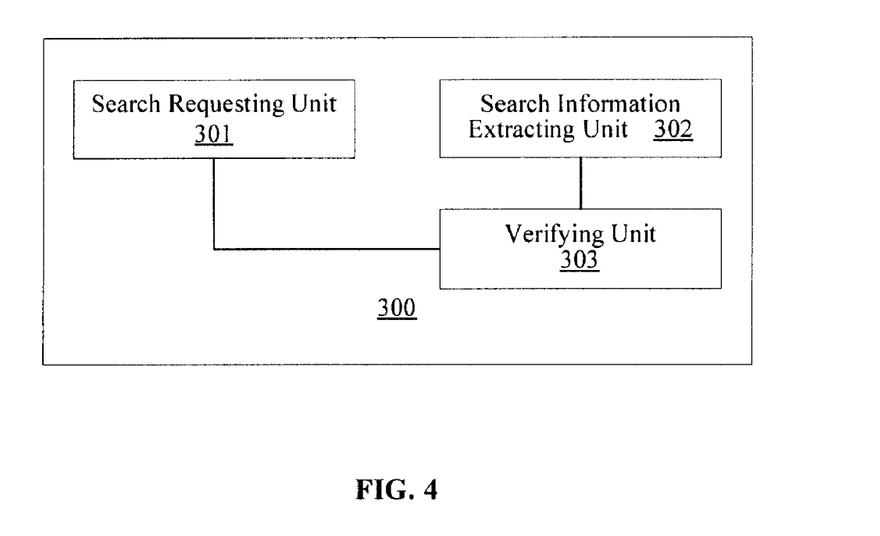
FIG. 4 is a block diagram schematically illustrating an exemplary configuration of a searcher terminal according to an embodiment of the invention.

FIG. 4 schematically illustrates an exemplary configuration of the searcher terminal 300 according to one embodiment of the invention. As shown in FIG. 4, the searcher terminal 300 mainly comprises a search requesting unit 301, a search information extracting unit 302 and a verifying unit 303.

Figure 5:
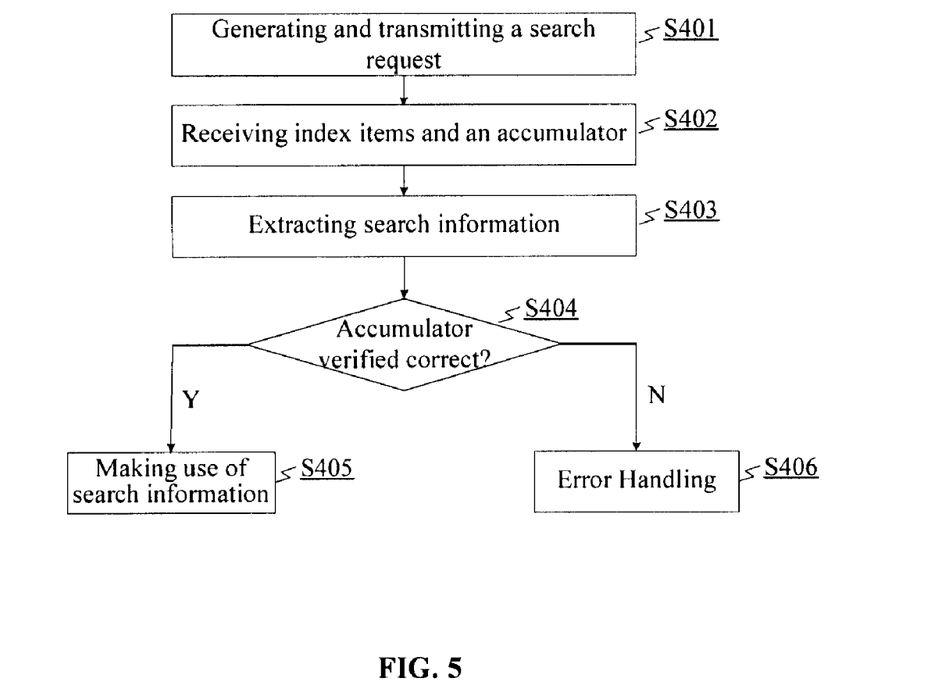
FIG. 5 is a flow chart schematically illustrating the processes of searching according to an embodiment of the invention.

FIG. 5 schematically illustrates processes for the searcher terminal 300 to perform search according to this embodiment.

First, at step S401, the search requesting unit 301 generates a search request containing at least a search item identifier, and transmits the search request to the server. The searcher may get the search item identifier from the data owner, or get data necessary for calculate the search item identifier from the data owner and calculate the search item identifier by a method corresponding to the method of generating the search item identifier at the time of forming the index at the data owner terminal.

After receiving the search request, the server looks up the index for an index entry having a search item identifier that matches with the received search item identifier, returns all the index items as well as the accumulator in that index entry to the searcher terminal. In the case that authentication is required, the server may authenticate the searcher before performing the above-mentioned lookup. If the server fails to find any matching index entry or the authentication of the searcher fails, the server may return a null result or enters into error handling, for example, sending a notification to the searcher terminal. In such situation, the searcher terminal performs a corresponding error routing, for example, retrying or ending the process.

If the server returns the search result, the searcher terminal would receive one or a plurality of index items as well as the corresponding accumulator at step S402.

Then at step S403, the search information extracting unit 302 of the searcher terminal extracts search information from each index item received. As described above, the index item may be the search information per se, and in such case, the search information is obtained directly. In the case that the index item is in a form of ciphertext of the search information or a value from which the search information may be obtained through conversion, the search information extracting unit 302 extracts the search information through a corresponding decryption or conversion. The parameters required for the decryption or conversion may be obtained from the data owner.

After getting search information contained in each index item, the verifying unit 303 of the searcher terminal checks whether the search result is complete and correct by using the received accumulator.

If it is verified correct, the procedure goes to step S405 where the obtained search information is used, for example for retrieving the corresponding files in accordance with the search information or for any further information processing. Since the use of the search information does not relate to the invention directly, the corresponding units or modules are not given in the drawing and the detailed description thereof is omitted. However, it should be appreciated that any necessary units or modules may be added thereto for performing requiring processes according to the particular application.

If the verification fails, the search result is indicated as incomplete or incorrect. It is probably due to tampering of data or error in data communication. In such situation, the procedure goes to step S406 for error handling, for example, resending the search request or requesting for retransmission or ending the process.

The method of verification with accumulator may be determined according to the method employed by the data owner terminal in generating the accumulator.

For example, the verifying unit 303 may calculate an accumulator based on the extracted search information by the same method as that used by the data owner terminal, and compares this accumulator with the accumulator received from the server. If they match, the verification is passed; otherwise, the verification fails. Several examples are proved below.

We assume that the search information extracting unit extracts search information $I'_1, I'_2, \ldots I'_m$ from all received index items. In the case that the accumulator is calculated according to the above Equation 3, the verifying unit 303 calculates $IC'=I'_1 \oplus I'_2 \oplus \ldots \oplus I'_m$, and compares IC' with the accumulator IC received from the server.

Similarly, in the case that the accumulator is calculated according to the above Equation 4, the verifying unit 303 calculates $$IC' = \prod_{i=1}^{m} I'_j \bmod p,$$

and compares IC' with the accumulator IC received from the server. Or, in the case that the accumulator is calculated according to the above Equation 5, the verifying unit 303 calculates $$IC' = \sum_{i=1}^{m} I'_j \bmod p,$$

and compares IC' with the accumulator IC received from the server.

In the case that the accumulator is generated in a form of accumulation signature according to the above Equation 6, the verification may be performed by verifying the accumulation signature. Particularly, the verifying unit 303 calculates $$IC' = \prod_{i=1}^{m} H(I'_i) \bmod p,$$

then checks whether there is a relation $e(IC', g_2) = e(IC, g_2^{sk} * g_2^K)$. If the relation stands, it is verified correct; otherwise, the verification fails.

In the case that any other method is used to generate the accumulator, the verifying unit 303 checks whether the search information is complete with the accumulator by using a corresponding method.

In some situations, the index needs to be updated. For example, search information changes when a new file is added or an existing file is deleted, and thereby the index shall be updated to ensure correct search. The index items may be updated according to addition or deleting of the files, and at the same time, the accumulator in the related index entry is also updated accordingly.

For example, if a piece of new search information $I_a$ is needed to be added to the index entry corresponding to the search item KW, the accumulator IC calculated according to the above Equation 3 may be updated as $$IC_{updated} = IC \oplus I_a \qquad \text{(Equation 7)}$$

the accumulator IC calculated according to the above Equation 4 may be updated as $$IC_{updated} = (IC * I_a) \bmod p \qquad \text{(Equation 8)}$$

the accumulator IC calculated according to the above Equation 5 may be updated as $$IC_{updated} = (IC + I_a) \bmod p \qquad \text{(Equation 9)}$$

and the accumulator IC calculated according to the above Equation 6 may be updated as $$IC_{updated} = [IC * H(I_a)^{1/(sk+K)}] \bmod p \qquad \text{(Equation 10)}$$

For the accumulator IC calculated according to the above Equation 6, it may be updated by using the alternative method as follow: first, selecting a new public random number K', and then calculating an updated accumulator $IC_{updated}$ as follow:

$$IC_{updated} = [IC^{(sk+K)} * H(I_a) \bmod p]^{1/(sk+K')} \qquad \text{(Equation 11)}$$

On the other hand, if a piece of existing search information is to be deleted from the index entry corresponding to the search item KW, the accumulator IC calculated according to the above Equation 3 may be updated as $$IC_{updated} = IC \oplus I_b \qquad \text{(Equation 12)}$$

the accumulator IC calculated according to the above Equation 4 may be updated as $$IC_{updated} = (IC * I_b^{-1}) \bmod p \qquad \text{(Equation 13)}$$

the accumulator IC calculated according to the above Equation 5 may be updated as $$IC_{updated} = (IC - I_b) \bmod p \quad \text{(Equation 14)}$$

and the accumulator IC calculated according to the above Equation 6 may be updated as $$IC_{updated} = [IC * H(I_b)^{-1/(sk+K)}] \bmod p \quad \text{(Equation 15)}$$

For the accumulator IC calculated according to the above Equation 6, it may be updated by using the alternative method as follow: first, selecting a new public random number K, and then calculating an updated accumulator $IC_{updated}$ as follow:

$$IC_{updated} = [IC^{(sk+K)} * H(I_b)^{-1} \bmod p]^{1/(sk+K')} \quad \text{(Equation 16)}$$

The update of the index entry may be performed by the data owner terminal, and the updated index entry is transmitted to the server to replace the previous one. Alternatively, the update may be performed by the server. Accordingly, an update unit (not shown) for updating the index may be configured in the data owner terminal or in the server.

The accumulation in the index according to the invention may be applied to various indices. For example, the accumulator may be applied similarly in an encrypted index. For example, index items in an index entry are ciphertext obtained by encrypting information containing the search information, and the accumulator is obtained by accumulating the search information wherein the search information may be an encrypted file name of an encrypted file. In such encrypted index, except for the data owner and the authorized searcher, other parties including the server cannot get the search information by encrypting the index items, nor can obtain the index items, which could be correctly decrypted, by simulation of the encryption process, thereby the index items and the accumulator are prevent from being tampered.

A fast searchable encryption method is provided below, in which an improved encrypted inverted index is employed and accumulators are used to provide verification of completeness of search result.

In this method, the data owner terminal encrypts each file with the same or different keys, and then stores the ciphertext of the files to the server. In this example, the above-described search information is an encrypted file name $CFN_j$ of the file $FILE_j$. Based on the encrypted file names, the server may readily find matching files among the stored encrypted files and provide the same to the requester.

At the phase of indexing, for a keyword KW taken as a search item, the data owner terminal calculates a search item identifier by encrypting information containing the keyword KW or mapping information containing the keyword KW to a value. For example, the search item identifier is calculated as KL=Hash(MEK∥KW), where MEK is a master key of the data owner.

Assuming that files $FILE_f$ (f=1, 2, ... n) contain the keyword KW, the data owner terminal calculates the index item $FL_j$ of $FILE_j$ related to KW as follow:

$$FL_j = E(EKey, I_j \| K_{filej}) \quad \text{(Equation 17)}$$

where $K_{filej}$ is a decryption key for the file $FILE_j$, $I_j$ is the encrypted file name of the file $FILE_j$, EKey is an encryption key for generating the index item, which is set by the data owner, and $E(EKey, I_j \| K_{filej})$ represents encryption of the combination of $I_j$ and $K_{filej}$ with EKey.

Then $I_j$ (j=1, 2, ... n) may be accumulated to generate an accumulator IC for the search item KW. For example, it is computed according to any one of the above Equations 3-6 or any other method.

After that, an index entry comprising at least KL, $FL_j$ (j=1, 2, ... n) and IC is generated for that keyword KW. An encrypted inverted index formed by such index entries is stored to the server.

If the data owner intend to enabling a searcher to perform search with a keyword, the data owner issues the search item identifier KL of that keyword to that searcher in a secure manner, and issues to the searcher an decryption key DKey for decrypting the index items.

At the phase of searching, the searcher terminal sends to the server a search request containing the search item identifier KL. The server looks up the stored encrypted index for a matching index entry according to the received search item identifier KL, and returns all index items $FL_j$ as well as the accumulator IC contained in the matching index entry to the searcher terminal.

After receiving each index items $FL_j$ from the server, the searcher terminal decrypts each index items $FL_j$ with the decryption key DKey issued by the data owner for encrypting the index items, such that the searcher obtains the encrypted file names and the corresponding decryption keys of the files, i.e. $I_j$ and $K_{filej}$.

Then, the date owner terminal uses the received accumulator IC to check whether all the acquired $I_j$ are complete. If it is verified correct, the searcher terminal may apply these $I_j$ correspondingly, for example, sending to the server to retrieving the encrypted files having the corresponding encrypted file names and then decrypting the encrypted files with the corresponding file decryption keys $K_{filej}$ so as to obtain the plain texts of the files. If the verification fails, the above described error handling may be performed.

In the above solution, the files and the search information are stored in an encrypted form on the server, so file information is prevent from being revealed to the server.

In an improved form of the above example, instead of calculating the accumulator directly from the search information $I_j$, ciphertext of information containing the search information $I_j$ or data mapped from information containing the search information $I_j$ is used in place of $I_j$ in calculating, verifying and updating the accumulator IC. For example, $I_j'=I_j\|X$ is used instead of the above-mentioned $I_j$ in calculating the accumulator, where X may be any predetermined information, e.g. DKey in the above example. And, $I_j'=I_j\|X$ may be used instead of $I_j$ in the equations in calculating the accumulator by XOR operation, modular operation and so on as described above, where X may be any predetermined information, e.g. DKey in the above example.

As described in the foregoing, an unauthorized third party cannot tamper the index items or the accumulators because the index items are ciphertext of information containing the search information, and the accumulator is formed by accumulating the search information.

In another improved form, the data owner may set different privacy levels and set index item encryption and decryption keys EKey and DKey differently for different privacy levels. When generating the index, for a file that is allowed to be disclosed at a certain privacy level, the index item encryption key for that privacy level is employed to generate the index items for that file. Thus, in an index entry related to a search item (keyword), there are index items of different privacy levels. In such situation, for the index items of each of privacy levels, an accumulator is generated. That is, in an index entry corresponding to one search item, an accumulator for a privacy level is generated by accumulating search information included in all index items of that privacy level. Thus, there multiple accumulators for different privacy levels.

In the above-mentioned improved solution, the data owner authorizes the searcher according to the privacy levels, that is, the index item decryption key DKey suitable for the privacy level of the searcher is issued to the searcher. At the time of searching, the searcher can decrypt, with the issued index item decryption key DKey, the index items, which are originally generated by using the index item encryption key EKey of the same privacy level, among all the index items received from the server, such that the searcher may obtain search information related to the search item at that privacy level. A predetermined flag may be set in the index item for verification of correctness of decryption. For example, the index item is generated as follow:

$$FL_j = E(EKey, FLAG \| I_j \| K_{file_j})  \quad \text{(Equation 17)}$$

where FLAG is a parameter known by the searcher. By this, the search may determine whether the decryption is performed correctly by checking existence of correct FLAG in the decrypted information.

And, after getting the search information of the corresponding privacy level by decryption, the searcher checks whether the search information at this privacy level is complete by using the received accumulator corresponding to this privacy level. The searcher may perform the check by using a plurality of accumulators included in the received index entry, and the verification is passed if any one of accumulator is verified correct. It is because that the probability that the calculated accumulator is equal to a received accumulator of a different privacy level is very low. Alternatively, the index entry may be divided with sections, that is, index items of the same privacy level are put into the same section, and thereby the searcher can determine which accumulator is to be used in verification by determining in which section the index items are decrypted correctly. Or alternatively, each accumulator may be attached with additional information, e.g. a parameter indicating the privacy level, to help the searcher to determine the right accumulator to be used. Or alternatively, the server may perform a process for determined the privacy level of the searcher at the time of searching, and then returns an accumulator of the corresponding privacy level to the searcher according the privacy level of the searcher. In such situation, the process of selecting the accumulator among those received is not needed at the searcher.

Some particular embodiments according to the invention have been described above with reference to the drawings. However, the invention is not intended to be limited by any particular configurations and processes described in the above embodiments. Those skilled in the art may conceive of various alternatives, changes or modifications of the above-mentioned configurations, algorithms, operations and processes within the scope of the spirit of the invention. For example, the example of inverted index is described in detail in the above. However, the invention is also applicable to non-inverted indices. For example, the search item in the above examples may be a file name or an encrypted file name, and the search information may be keywords or encrypted keywords and the like included in the file. In a non-inverted index, the accumulator may be applied in a similar way. Further, in the above examples, an index entry comprises at least a search item identifier, index items and an accumulator. However, it would be appreciated that any other necessary information and data may be added to the index entries depending on requirements of any particular application.

The so called "file" as used in this description should be interpreted as a broad concept, and it includes but not limits to, for example, text file, video/audio file, pictures/charts, and any other data or information.

As exemplary configurations of the data owner terminal, the searcher terminal and the server, some units coupled together have been shown in the drawing. These units can be coupled via a bus or any other signal lines, or by any wireless connection, to transfer signals therebetween. However, the components included in each apparatus are not limited to those units described, and the particular configuration may be modified or changed. Each apparatus may further comprise other units, such as a display unit for displaying information to the operator of the device, an input unit for receiving the input of the operator, a controller for controlling the operation of each unit, any necessary storage means, etc. They are not described in detail since such components are known in the art, and a person skilled in the art would easily consider adding them to the apparatus described above. In addition, although the described units are shown in separate blocks in the drawings, any of them may be combined with the others as one component, or be divided into several components.

Further, data owner terminal, searcher terminal and the server are described and shown as separate apparatus in the above examples, which may be positioned remotely each other in a communication network. However, they can be combined as one apparatus for enhanced functionality. For example, the data owner terminal and the searcher terminal could be combined to create a new apparatus that acts as a data owner terminal in some cases while capable of performing search as a searcher terminal in some other cases. For another example, the server and the data owner terminal or the searcher terminal could be combined if it acts these roles in an application. Also, apparatus may be created to act as data owner terminal, searcher terminal and server in different transactions.

The communication network described above may be any kind of network including any kind of telecommunication network or computer network. It can also comprise any internal data transfer mechanism, for example, a data bus or hub when the data owner terminal, the searcher terminal and the server are implemented as parts of a single apparatus.

The elements of the invention may be implemented in hardware, software, firmware or a combination thereof and utilized in systems, subsystems, components or sub-components thereof. When implemented in software, the elements of the invention are programs or the code segments used to perform the necessary tasks. The program or code segments can be stored in a machine-readable medium or transmitted by a data signal embodied in a carrier wave over a transmission medium or communication link. The "machine readable medium" may include any medium that can store or transfer information. Examples of a machine readable medium include an electronic circuit, a semiconductor memory device, a ROM, a flash memory, an erasable ROM (EROM), a floppy diskette, a CD-ROM, an optical disk, a hard disk, a fiber optic medium, a radio frequency (RF) link, etc. The code segments may be downloaded via computer networks such as the Internet, Intranet, etc.

The invention may be embodied in other specific forms without departing from the spirit or essential characteristics thereof. For example, the algorithms described in the specific embodiment can be modified as long as the characteristics do not depart from the basic spirit of the invention. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. A method for generating an index, comprising:
   generating a search item identifier corresponding to a search item;

generating one or more index items according to one or more pieces of search information associated with the search item;

generating, by one or more processors, an accumulator for the one or more pieces of search information;

generating an index entry with at least the search item identifier, the one or more index items and the accumulator so as to form an index; and sending the one or more index items and the accumulator to a searcher in response to a search request from the searcher, wherein the searcher extracts the one or more pieces of search information from the received one or more index items and verifies the extracted search information by the received accumulator.

2. The method according to claim 1, wherein generating the accumulator comprises accumulating the one or more pieces of information by at least one of accumulation signature, XOR operation and modular operation.

3. The method according to claim 1, wherein the search item is a keyword, and the search information is an encrypted file name of a file containing the keyword.

4. The method according to claim 1, wherein generating the search item identifier comprises generating ciphertext of information containing the search item, or generating data obtained by mapping from information containing the search item.

5. The method according to claim 1, wherein generating the index item comprises generating ciphertext of information containing the search information.

6. The method according to claim 1, wherein generating the index item comprises encrypting information containing corresponding search information with an index item encryption key.

7. The method according to claim 1, wherein generating the accumulator comprises accumulating ciphertext of information containing the search information, or accumulating data obtained by mapping from information containing the search information.

8. The method according to claim 1, further comprising updating the accumulator when a piece of search information is added or deleted.

9. The method according to claim 8, wherein the accumulator is calculated as $IC = I_1 \oplus I_2 \oplus \ldots \oplus I_n$ where $I_1, I_2, \ldots I_n$ are search information to be accumulated and $\oplus$ denotes XOR operation, and the updating comprises:

updating the accumulator to $IC_{updated} = IC \oplus I_a$ when search information $I_a$ is to be added or deleted.

10. The method according to claim 8, wherein the accumulator is calculated as $$IC = \prod_{j=1}^{n} I_j \bmod p,$$

where $I_j$ are search information to be accumulated and p is a big prime number, and the updating comprises:

updating the accumulator to $IC_{updated} = (IC * I_a) \bmod p$ when search information $I_a$ is to be added; and updating the accumulator to $IC_{updated} = (IC * I_b^{-1}) \bmod p$ when search information $I_b$ is to be added.

11. The method according to claim 8, wherein the accumulator is calculated as $$IC = \sum_{j=1}^{n} I_j \bmod p,$$

where $I_j$ are search information to be accumulated and p is a big prime number, and the updating comprises:

updating the accumulator to $IC_{updated} = (IC + I_a) \bmod p$ when search information $I_a$ is to be added; and updating the accumulator to $IC_{updated} = (IC - I_b) \bmod p$ when search information $I_b$ is to be added.

12. The method according to claim 8, wherein the accumulator is calculated as $$IC = \prod_{j=1}^{n} H(I_j)^{1/(sk+K)} \bmod p,$$

and $g_2$ and K are published or $g_2^k$ is published, where $I_j$ are search information to be accumulated, sk is a secret key, p is a big prime number, H is a hash function mapping a string to $G_1$, K is a random number in $Z_p^*$, $Z_p^*$ is a collection of all positive integers less than and coprime to p, $g_2$ is a generator of $G_2$, $G_1$ and $G_2$ are groups both having order of p, and there is a bilinear mapping with about $G_1$ and $G_2$, and the updating comprises:

updating the accumulator to $IC_{updated} = [IC^{(sk+K)} * H(I_a) \bmod p]^{1/(sk+K')}$ and publishing K' or $g_2^{k'}$, when search information $I_a$ is to be added, where K' is a random number in $Z_p^*$ and different from K; and updating the accumulator to $[IC^{(sk+K)} * H(I_b)^{-1} \bmod p]^{1/(sk+K')}$ and publishing K' or $g_2^{k'}$, when search information $I_b$ is to be added, where K' is a random number in $Z_p^*$ and different from K.

13. The method according to claim 1, wherein the accumulator indicates whether a search result containing the search information is complete.

14. An apparatus for generating an index, comprising:

a search item identifier generating unit adapted to generate a search item identifier corresponding to a search item;

an index item generating unit adapted to generate one or more index items according to one or more pieces of search information associated with the search item;

an accumulator generating unit adapted to generate an accumulator for the one or more pieces of search information; and an index forming unit, implemented by one or more processors, adapted to generate an index entry with at least the search item identifier, the one or more index items and the accumulator so as to form an index;

the accumulator is used for verifying completeness of search results.

15. The apparatus according to claim 14, wherein the accumulator generating unit is configured to generate the accumulator by accumulating the one or more pieces of information by at least one of accumulation signature, XOR operation and modular operation.

16. The apparatus according to claim 14, wherein the search item is a keyword, and the search information is an encrypted file name of a file containing the keyword.

17. The apparatus according to claim 14, wherein the search item identifier generating unit is configured to generate the search item identifier by generating ciphertext of information containing the search item, or generating data obtained by mapping from information containing the search item.

18. The apparatus according to claim 14, wherein the index item generating unit is configured to generate the index item by generating ciphertext of information containing the search information.

19. The apparatus according to claim 14, wherein the index item generating unit is configured to generate the index item by encrypting information containing corresponding search information with an index item encryption key.

20. The apparatus according to claim 14, wherein the accumulator generating unit is configured to generate the accumulator by accumulating ciphertext of information containing the search information, or accumulating data obtained by mapping from information containing the search information.

21. apparatus according to claim 14, further comprising an updating unit adapted to update the accumulator when a piece of search information is added or deleted.

22. The apparatus according to claim 21, wherein the accumulator generating unit is configured to calculate the accumulator as $IC = I_1 \oplus I_2 \oplus \ldots \oplus I_n$ where $I_1, I_2, \ldots I_n$ are search information to be accumulated and $\oplus$ denotes XOR operation, and the updating unit is configured to update the accumulator to $IC_{updated} = IC \oplus I_a$ when search information $I_a$ is to be added or deleted.

23. The apparatus according to claim 21, wherein the accumulator generating unit is configured to calculate the accumulator as $$IC = \prod_{j=1}^{n} I_j \bmod p,$$

where $I_j$ are search information to be accumulated and p is a big prime number, and:

the updating unit is configured to update the accumulator to $IC_{updated} = (IC * I_a) \bmod p$ when search information $I_a$ is to be added; and update the accumulator to $IC_{updated} = (IC - I_b) \bmod p$ when search information $I_b$ is to be added.

24. The apparatus according to claim 21, wherein the accumulator generating unit is configured to calculate the accumulator as $$IC = \sum_{j=1}^{n} I_j \bmod p,$$

where $I_j$ are search information to be accumulated and p is a big prime number, and the updating unit is configured to update the accumulator to $IC_{updated} = (IC + I_a) \bmod p$ when search information $I_a$ is to be added; and update the accumulator to $IC_{updated} = (IC - I_b) \bmod p$ when search information $I_b$ is to be added.

25. The apparatus according to claim 21, wherein the accumulator generating unit is configured to calculate the accumulator as $$IC = \prod_{j=1}^{n} H(I_j)^{1/(sk+K)} \bmod p,$$

and $g_2$ and K are published or $g_2^k$ is published, where $I_j$ are search information to be accumulated, sk is a secret key, p is a big prime number, H is a hash function mapping a string to $G_1$, K is a random number in $Z_p^*$, $Z_p^*$ is a collection of all positive integers less than and coprime to p, $g_2$ is a generator of $G_2$, $G_1$ and $G_2$ are groups both having order of p, and there is a bilinear mapping with about $G_1$ and $G_2$, and the updating unit is configured to update the accumulator to $IC_{updated} = [IC^{(sk+K)} * H(I_a) \bmod p]^{1/(sk+K')}$ and publish K' or $g_2^{k'}$, when search information $I_a$ is to be added; and update the accumulator to $[IC^{(sk+K)} * H(I_b)^{-1} \bmod p]^{1/(sk+K')}$ and publish K' or $g_2^{k'}$, when search information $I_b$ is to be added, where K' is a random number in $Z_p^*$ and different from K.

26. The apparatus according to claim 14, wherein the accumulator indicates whether a search result containing the search information is complete.

* * * * *

UNITED STATES PATENT AND TRADEMARK OFFICE
CERTIFICATE OF CORRECTION

PATENT NO. : 8,266,137 B2
APPLICATION NO. : 12/616551
DATED : September 11, 2012
INVENTOR(S) : Hao Lei et al.

It is certified that error appears in the above-identified patent and that said Letters Patent is hereby corrected as shown below:

In the Specification

Column 8, Line 1-4: Delete " $IC' = \sum_{i=1}^{m} I'_j \bmod p$, " and insert -- $IC' = \sum_{i=1}^{m} I'_j \bmod p$, --
Column 9, Line 8: Delete "K," and insert -- K', --
Column 9, Line 39: After "information" insert -- $I_j$ --
Column 9, Line 50: Delete "(f= 1, 2, . . . n)" and insert -- (j= 1, 2, . . . n) --
Column 10, Line 22: After "sending" insert -- $I_j$ --

In the Claims
Column 13, Line 46: In Claim 9, delete "$I_n$" and insert -- $I_n$, --
Column 15, Line 16 (Approx.): In Claim 21, delete "apparatus" and insert -- The apparatus --
Column 15, Line 21: In Claim 22, delete "$I_n$" and insert -- $I_n$, --
Column 15, Line 40-41: In Claim 23, delete "$IC_{updated}=(IC- I_b) \bmod p$" and insert
-- $IC_{updated} = (IC * I_b^{-1}) \bmod p$ --

Signed and Sealed this
Eleventh Day of November, 2014

Michelle K. Lee
*Deputy Director of the United States Patent and Trademark Office*